Figure 1:
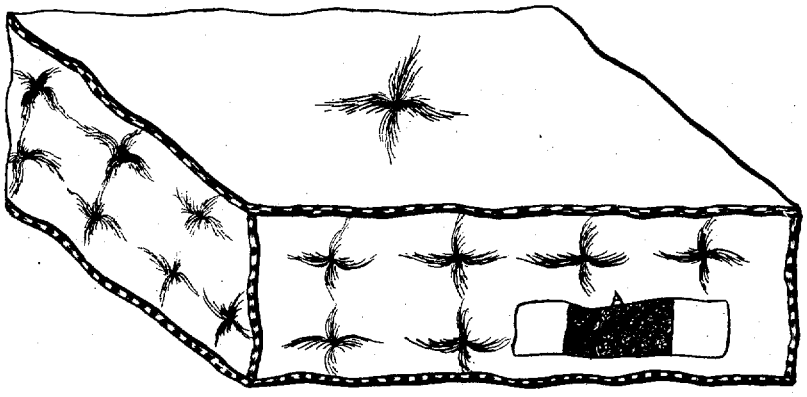

F. A. LANE.

Stuffing for Mattresses.

No. 5,379. Reissued April 29, 1873.

*Witnesses.*

L. M. Cox

A. F. Cornell.

*Inventor.*

F. A. Lane.

Per. Burridge & Co.

Attys.

AM. PHOTO-LITHOGRAPHIC CO. N.Y. (OSBORNE'S PROCESS.)

UNITED STATES PATENT OFFICE.

FREDERICK A. LANE, OF CLEVELAND, OHIO, ASSIGNOR, BY MESNE ASSIGNMENTS, TO HIMSELF, LUTHER S. LANE, OF SWANZEY, NEW HAMPSHIRE, AND EPHRAIM KENDALL, OF CLEVELAND, OHIO.

IMPROVEMENT IN STUFFINGS FOR MATTRESSES.

Specification forming part of Letters Patent No. 90,308, dated May 25, 1869; reissue No. 5,266, dated February 4, 1873; reissue No. 5,379, dated April 29, 1873; application filed March 28, 1873.

*To all whom it may concern:*

Be it known that I, FREDERICK A. LANE, of Cleveland, in the county of Cuyahoga and State of Ohio, have invented or produced a new and Improved Stuffing for Mattresses, &c.; and I do hereby declare that the following is a full and exact description.

The nature of this invention consists in providing a new and improved article, made from woolen fibers of refuse woolen goods, rags, &c., to be applied to stuffing purposes of all kinds, which may be bunched or curled or used in its open and free fibrous state for stuffing for bedding and upholstery purposes.

To enable others skilled in the art to make and use my invention, I will proceed to describe the same—how prepared and applied.

Figure 1 represents a perspective view of a mattress with parts removed, showing the application of my improved article; A being the woolen fiber, which is homogeneous or uniform in character.

The woolen fiber applied to stuffing is made from waste and refuse woolen goods, rags, druggets, &c. When the fiber is to be used, curled, and bunched, the said refuse is made to pass through the different kinds of operation requisite to convert the same into shoddy or open and free fiber. This mass of woolen fibers is then passed through what is termed a duster, which completely removes the dust and dirt. The dust may be removed otherwise therefrom. This mass of woolen fiber, by being passed through the duster at a certain speed, becomes curled and bunched more or less, as required.

This fiber may be used for stuffing purposes of all kinds, and the bunching and curling thereof gives the article stuffed the required elasticity, preventing it from matting.

Thus I am enabled to produce an article of open and free fiber, or curled and bunched, that can be used in upholstery, bedding, &c., which is nearly equal in quality and durability to curled hair, and can be furnished at a much cheaper rate, and will supply the wants of the public, as it will come within the reach of every one.

*Claims.*

What I claim as my invention, and desire to secure by Letters Patent, is—

1. As an improved article of manufacture for stuffing purposes, woolen fiber made from the refuse of woolen goods, rags, &c., by bunching and curling, as described.

2. The prepared homogeneous woolen fiber for stuffing bedding, upholstering, &c., when made from the waste or refuse of woolen goods, rags, &c., and by separating the woven or interlocking fibers thereof and rendering them free and open, substantially as set forth.

FREDERICK A. LANE.

Witnesses:

F. D. STONE,

JACOB KOEHL.